Figure 1:
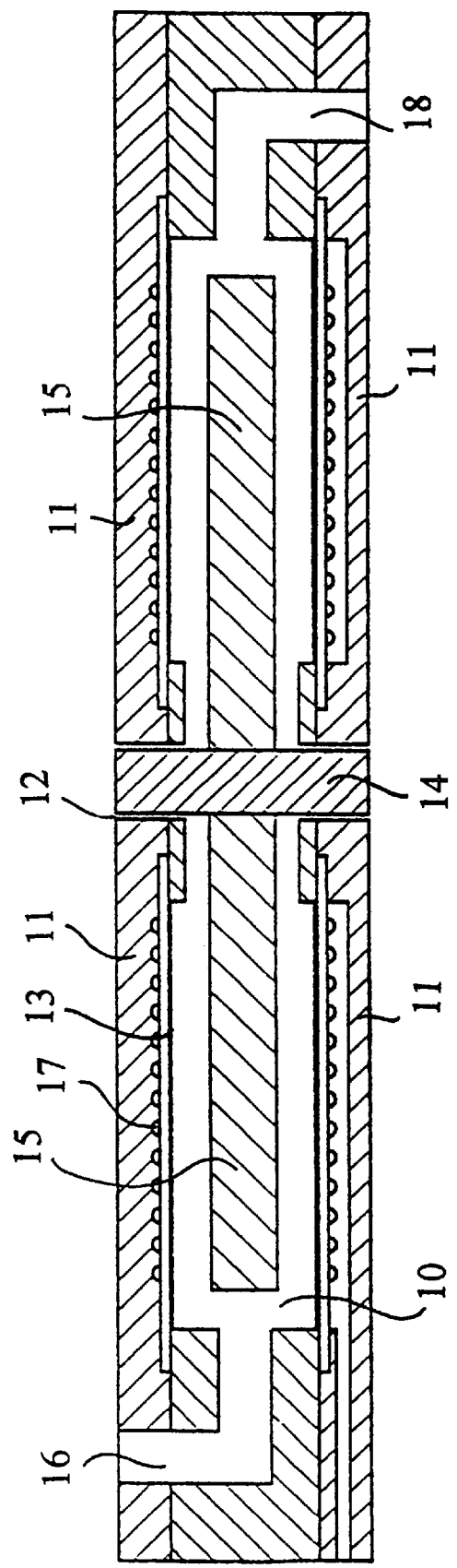

United States Patent

Henttonen et al.

[11] Patent Number: 6,027,656
[45] Date of Patent: Feb. 22, 2000

[54] SEPARATION METHOD AND APPARATUS

[75] Inventors: Vesa Henttonen, Turku; Pasi Leimu, Poikko, both of Finland; Claes Karlsson; Milan Teppler, both of Västerås, Sweden; Jaakko Paatero, Turku, Finland

[73] Assignee: Valmet Flootek Oy, Raisio, Finland

[21] Appl. No.: 09/142,143

[22] PCT Filed: Feb. 26, 1997

[86] PCT No.: PCT/FI97/00129

§ 371 Date: Jan. 4, 1999

§ 102(e) Date: Jan. 4, 1999

[87] PCT Pub. No.: WO97/32652

PCT Pub. Date: Sep. 12, 1997

[30] Foreign Application Priority Data

Mar. 4, 1996 [FI] Finland ..................... 960993

[51] Int. Cl.[7] .................. B01D 37/00; B01D 63/00
[52] U.S. Cl. .................. 210/767; 210/636; 210/650; 210/231; 210/321.63
[58] Field of Search .................. 210/767, 650, 210/636, 321.63, 231, 232, 321.75, 321.67

[56] References Cited

U.S. PATENT DOCUMENTS

| | | | |
|---|---|---|---|
| 3,541,004 | 11/1970 | Cooper et al. ............ | 210/636 |
| 3,948,776 | 4/1976 | Donovan ................. | 210/320 |
| 4,722,789 | 2/1988 | Kupka ................... | 210/231 |
| 4,740,312 | 4/1988 | Dahlquist et al. ........ | 210/636 |
| 4,919,806 | 4/1990 | Yagishita ............... | 210/334 |
| 5,019,255 | 5/1991 | Dahlquist et al. ........ | 210/231 |
| 5,415,781 | 5/1995 | Randhahn et al. ......... | 210/650 |
| 5,707,517 | 1/1998 | Rolchigo et al. ......... | 210/232 |

FOREIGN PATENT DOCUMENTS

WO93/12859 8/1993 WIPO.

*Primary Examiner*—Ana Fortuna
*Attorney, Agent, or Firm*—Burns, Doane, Swecker Mathis, L.L.P.

[57] ABSTRACT

The invention concerns a method and a device for separation of separable constituents from a liquid medium. The separation device comprises only one cell or a stack of a plurality of adjacent cell, whereby each cell consists of a plate unit containing a filter, an inlet for supplying the liquid medium into a chamber, and outlet for discharging the reject and an outlet for discharging the permeate. The liquid medium is subjected to a strong turbulence created by a convenient designed rotor, possible combined with sound waves, whereby the deposition of separable constituents on the filter is prevented or essentially reduced. According to the invention a rotor is used in which the essentially plane surface of the rotor wings directed toward the filter comprises one or more areas deviating from the plane of said surface; or the surface of the rotor wings directed towards the filter is curved in such a way that the distance between the surface of the wing and the filer is small at the inner portion of the rotor and that said distance gradually increases towards the periphery of the rotor, or the section of the rotor wings in the plane parallel with the filter forms an almost S-shaped surface, whereby the S-shape is continuous.

9 Claims, 6 Drawing Sheets

SEPARATION METHOD AND APPARATUS

The present invention relates to a method and device based on cross flow membrane filtration for separation of separable constituents from a liquid medium.

In a cross flow filter a liquid is supplied to a chamber comprising at least one dynamic membrane. The liquid being supplied is divided into a permeate flow penetrating the dynamic membrane and a reject flow flowing along the filter without penetrating said filter.

Cross flow filter apparatuses are described in the patent literature, for example, in the Swedish Publication Prints SE 451429, 457607, 459475, 463241 and 465040. Methods based on the use of such apparatuses are successfully applied for separation of solid constituents from a liquid phase and for separation of liquid from liquid, for example, for separation of oil from water.

FIG. 1 shows a section of a separation device of the type disclosed in SE 451429. The device comprises a chamber 10 in which plates 11 provided with center holes 12 are arranged. A dynamic filter membrane 13 is fastened on the plates. A rotor shaft 14 provided with rotor wings 15 runs through the center holes of the plates. The liquid to be prepared is supplied into the rotor chamber through the channel 16 whereby part of it (the permeate) passes through the filter and is collected via channels 17 in the plate to be eventually discharged through a permeate outlet. The portion of the liquid flow (the reject) which does not permeate the filter is discharged through the channel 18. By means of the rotor wings 15 the liquid is pushed across the filter surface 13 and a possible porous layer applied onto it.

SE 459475 describes a separation device comprising a number of adjacently arranged units or cells according to SE 451429. The liquid to be treated is supplied through a joint channel formed by through-holes in the plates. The collected permeate is discharged through a common outlet and the reject is discharged through a common conduit for the outgoing reject.

The filter membrane itself can also be provided with one or more layers of a porous material, for example, of the kind described in the above mentioned patent publications.

Clogging of the pores of the filter membrane or the porous material applied onto it due to deposit of separated constituents is a big problem. Due to the clogging the separation capacity rapidly diminishes and because of this it is necessary to regenerate the filter with regular intervals. According to the publication SE 451429 the regeneration is carried out in such a way that elements (brushes, valves or the like) connected to the rotor wings are brought into contact with the porous layer on the filter membrane. Hereby the constituents separated from the liquid flow are removed and a portion of the porous material as well. New porous material is added when necessary.

Mechanical regeneration of this type, which involves touching of the filter membrane or the porous layer on it, is always connected with the risk of disturbing the wanted pore size. Therefore it is highly desirable to avoid regeneration methods of this kind.

According to the present invention a separation method and a separation device is obtained in which the filter is kept free of deposition of separated substance.

The characteristic features of the invention are disclosed in the independent claims 1 and 2.

The advantages of the invention are based on the supplied liquid medium being subjected to a strong turbulence created by a suitably formed rotor, possibly in connection with sound waves, preferably ultrasound, and/or an electric field, whereby the depositition of separable particles on the filter is prevented or essentially reduced.

According to one embodiment of the rotor it is designed in such a way that the essentially plane surfaces of the wings directed towards the filter are provided with irregularities deviating from the plane of the wing surface. The irregularities may, for example, be through-holes, recesses or slots, or bosses.

According to another advantageous embodiment the surface of the rotor wings directed towards the filter is curved so that the distance between the surface of the wing and the filter is small at the inner point of the rotor and that said distance gradually grows towards the periphery of the rotor.

According to a third embodiment the rotor wings are designed in such a way that they in a plane parallel to the filter form an S-shaped piece, whereby the S-shape is continuous.

An especially advantageous embodiment of the rotor is achieved by combining the S-shape with any of the above mentioned embodiments of the surface of the rotor directed towards the filter.

Figure 2:
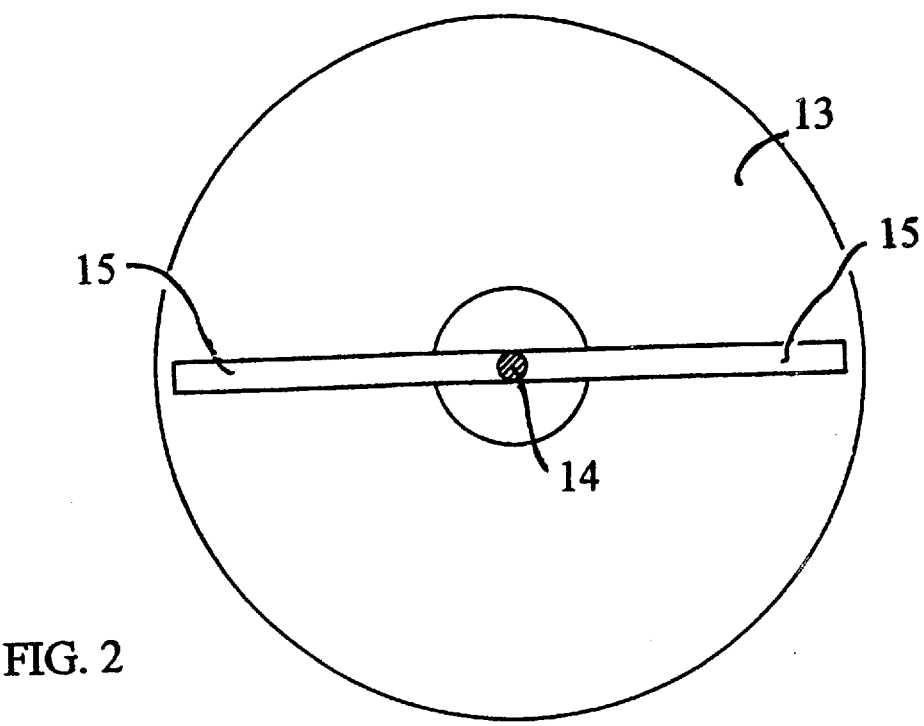
Figure 3:
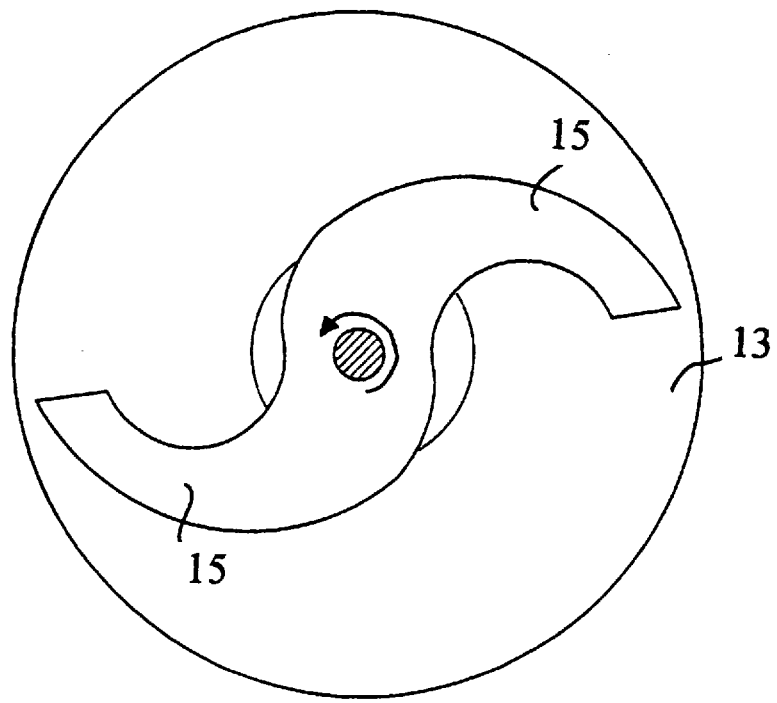
Figure 4:
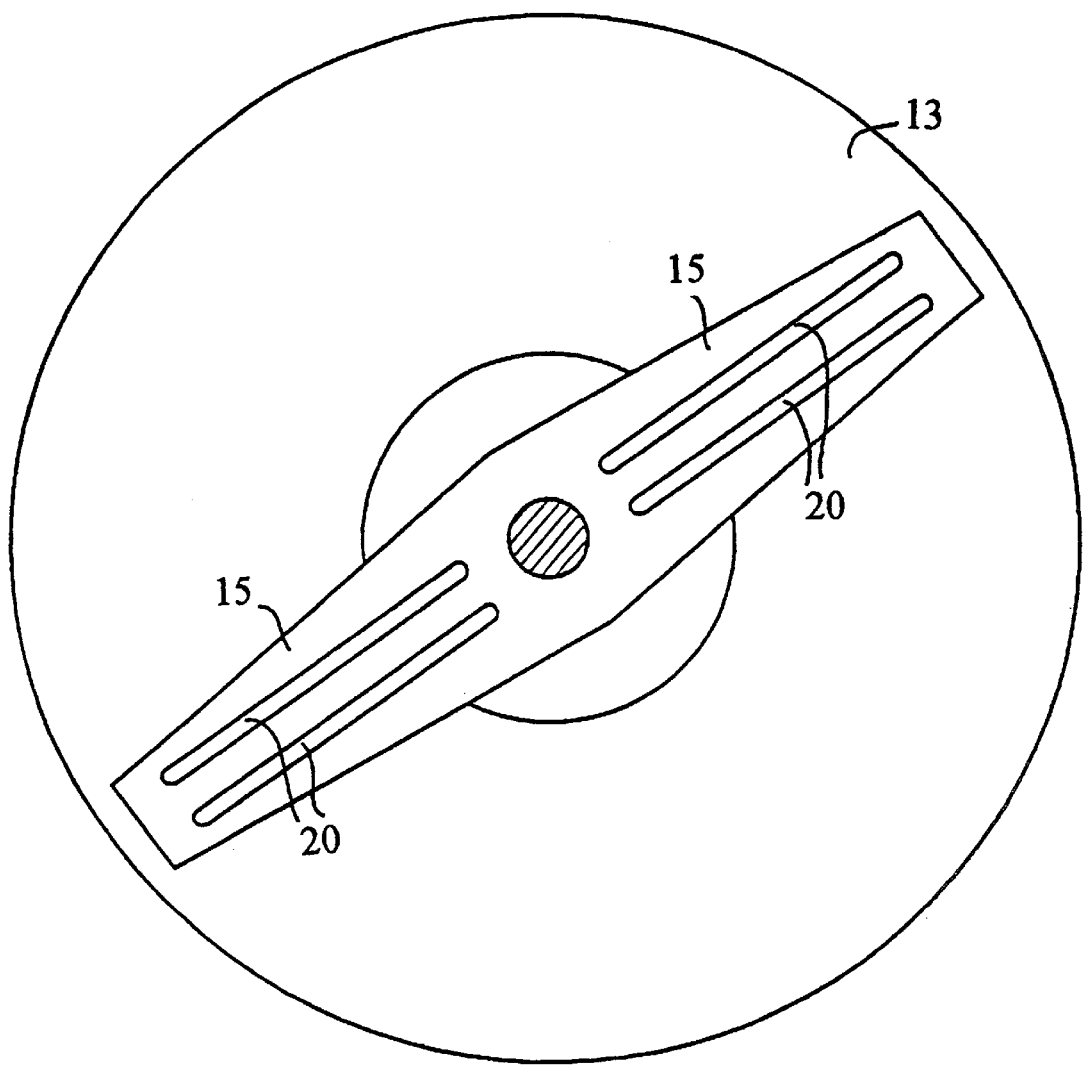
Figure 6A:
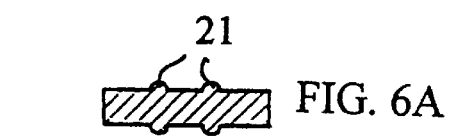
Figure 6B:
Figure 6C:
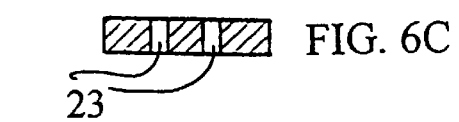
Figure 5:
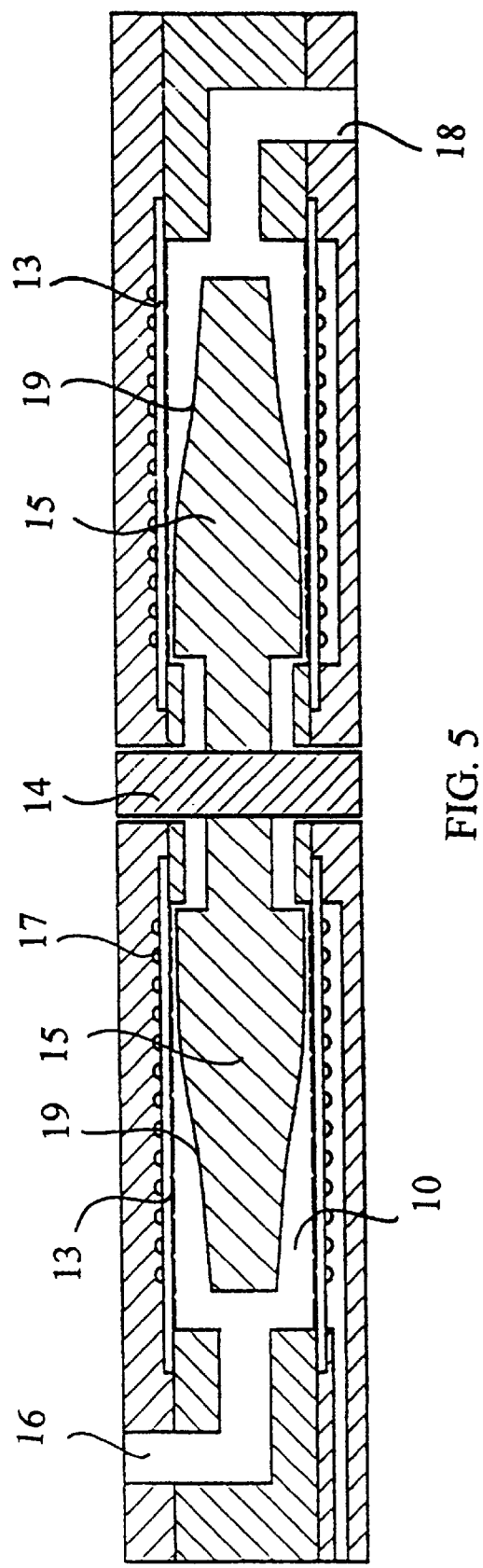
Figure 7A:
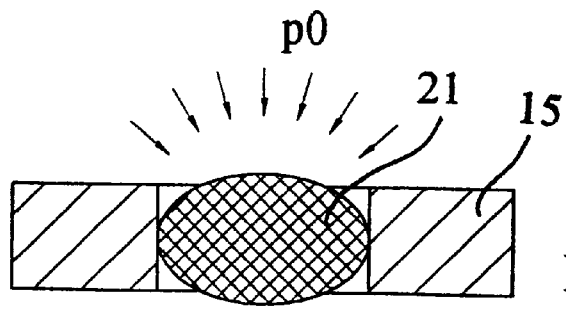
Figure 7B:
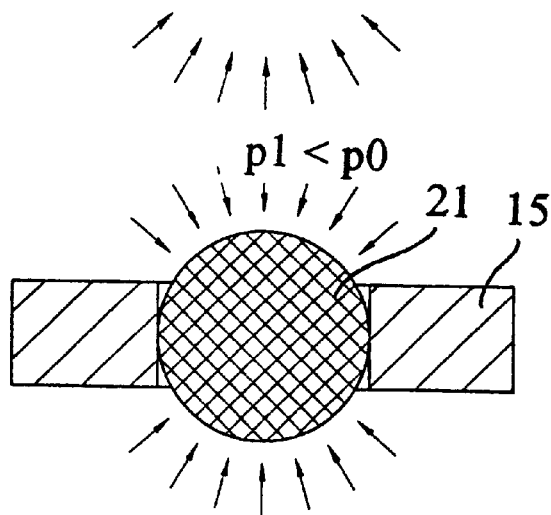
Figure 7C:
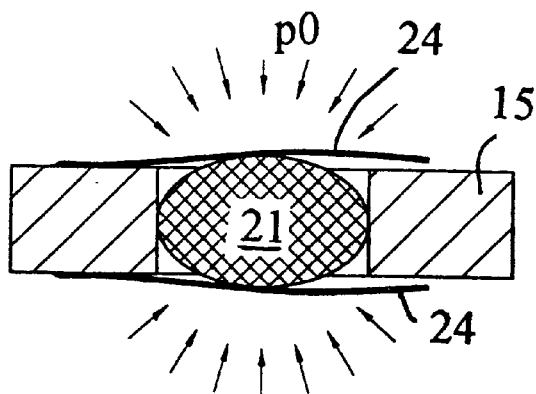
Figure 7D:
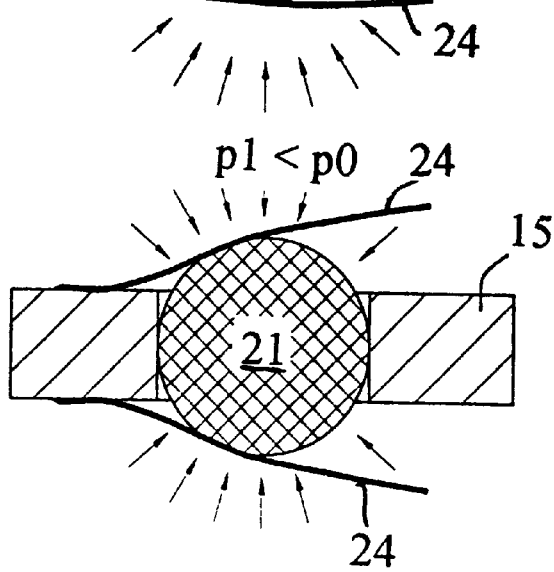
Figure 8:
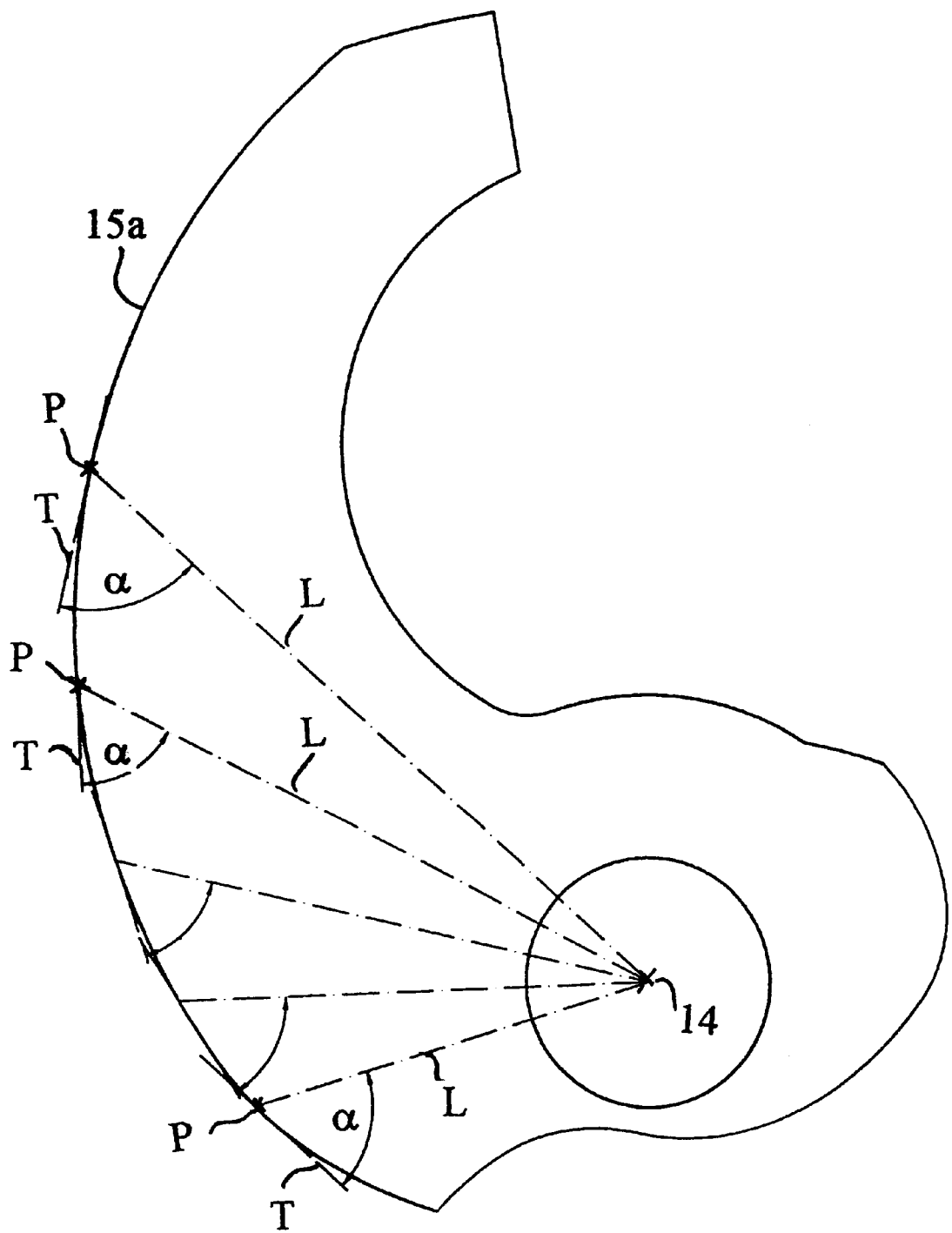

The invention will be described in greater detail with reference to the accompanying drawings, wherein FIG. 1 shows a section of a separation device according to prior art, FIG. 2 shows a previously known rotor intended for the device in FIG. 1, FIG. 3 shows a rotor according to the present invention in one embodiment, FIG. 4 shows a rotor in a second embodiment, FIG. 5 shows a rotor in a third embodiment, FIGS. 6A to 6C show a cross section of the rotor wings in FIG. 4, FIGS. 7A to 7D show a cross section of the rotor wings according to a further embodiment, and FIG. 8 shows an embodiment of the rotor wing according to FIG. 3.

FIG. 2 shows a previously known rotor viewed against the plane of the filter 13. The rotor consists of two rotor wings 15 fastened to the rotor shaft 14. The rotor wings 15 are massive, almost rectangular prisms.

FIG. 3 shows an example of a rotor according to the invention. The rotor wings 15 are curved in such a way that their section in a plane parallel with the filter 13 forms an S-shaped surface. When operating the rotor rotates in the direction of the arrow. Rotors of the known type according to FIG. 2 mainly cause a liquid flow in the rotation direction. In test runs with a rotor according to FIG. 3 it has been shown that the concave sections on the rotor wings cause a strong liquid flow also in the radial direction. When a conventional rotor is being used the circular speed diminishes when the rotor shaft is approaching. As shown in the figure the rotor forms a continuous S-form projecting diametrally through the rotor shaft. Due to the radial liquid flow caused by said continuous S-form a higher turbulence is achieved also in the vicinity of the rotor shaft. As a result of this a sufficiently strong turbulence is achieved over the entire filter surface in the surrounding liquid medium in order to prevent separable constituents from depositing on the filter. Another advantage of the S-form is that the convex portions of the rotor wings encountering the surrounding liquid medium are effectively kept free from deposits. An essential advantage of said S-form is that the pumping effect of the rotor, which in this connection is undesirable, will be compensated for by the increased liquid turbulence.

FIG. 8 shows an especially advantageous embodiment of the wing profile according to FIG. 3. The convex profile 15a of the rotor wing is formed so that the angle α between the line L drawn from the shaft 14 to an arbitrary point P on the profile 15a and the tangent T to the profile 15a in said point, is always almost constant and thus independent of the position of said point P. The angle α is preferably between 45° to 80°, advantageously about 60°. Due to this embodiment the convex surface is kept free from deposits at the same time as the rotor needs very little power.

FIG. 4 shows another shape of the rotor wings. The rotor wings 15 are bodies essentially shaped as prisms and their surface directed towards the filter 13 is essentially plane. Said surface is provided with one or more areas 20 deviating from the plane of said surface. FIGS. 6A to 6C, which show a cross section of the rotor wings in FIG. 4, show alternative shapes of the irregularities 20. In FIG. 6A said irregularities consist of bosses 21, in FIG. 6B of recesses 22 and in FIG. 6C of through-holes 23. The irregularities 20 of the rotor wings may also be a combination of one or more holes 23, one or more recesses 22 and/or one or more bosses 21.

The presence of irregularities, especially recesses or through-holes, reduces the unwanted pumping effect of the rotor due to higher turbulence. Simultaneously the recesses and holes cause a smaller contact surface between the rotor blade and the surrounding liquid which in its turn reduces friction and thus also the need of power.

FIGS. 7A–7D, which show a cross section of the rotor blade 15, show an especially advantageous embodiment of the bosses 21 which in this case are composed of another material than the rotor wing itself. The bosses 21 consist of separate bodies mounted in holes running through the rotor blade. Alternatively said bodies can be mounted in recesses in the rotor blade or be fastened onto its surface. Said bodies can be liquid or gas impermeable compressable pieces of, for example, foam plastic with closed cells, a gas-filled cover etc. The advantage of this construction is that it is possible to act on the size of the bodies by means of the surrounding pressure. It is, for example, possible to choose such a material for the body 21 which is strongly compressed at the normal working pressure of the separation device (FIG. 7A), whereby the boss above the plane of the rotor surface is very slight or nonexistent and thus the power need of the rotor is slight. When needed the working pressure can be changed to p1, which is lower than p0, whereby the body 21 expands (FIG. 7B). Hereby the distance to the surface of the filter is reduced and the turbulence increases. Therewith the cleansing effect of the filter membrane increases. It is also possible that the body 21 expands so much that it will come into contact with the filter membrane whereby mechanical cleansing is achieved. It is also possible to let the bodies 21 act as regulating means acting on mechanical devices 24 in the form of flexible elements or the like attached to the rotor blade which elements in their turn come into contact with the filter membrane (FIGS. 7C and 7D).

FIG. 5 shows a rotor type according to a third embodiment in a section perpendicular to the plane of the filter 13. The surface 19 of the rotor wing 15 which is directed towards the filter 13 is curved in such a way that the distance between the surface of the wing and the filter is small at the inner portion of the rotor, i.e. in the vicinity of the rotor shaft 14 and that said distance gradually grows towards the periphery of the rotor. By means of this embodiment of the rotor wings it is possible to achieve a good and even turbulence over the entire filter surface in the liquid medium positioned in the chamber 10. When rotor wings with an even thickness are being used the circular speed (and thereby turbulence) is low in the vicinity of the rotor shaft. By reducing the distance between the rotor surface 19 and the filter 13 according to the construction in FIG. 5 in this area the turbulence is increased. The circular speed and thereby also the turbulence is high at the periphery of the rotor wings. In this area it is advantageous to increase the distance between the surface 19 of the rotor wing and the filter 13 in order to further counteract increase of the turbulence. If the distance between the rotor wing and the filter were to be small also at the periphery of the wing this would lead to an undesired power increase in order to achieve the rotation.

The rotor wings according to FIG. 5 can also be provided with irregularities of the same kind as the rotor wings according to FIG. 4, for example through-holes, bosses and recesses.

It is known that the use of sound waves, especially ultrasound, furthers filtration and prevents clogging of the filter pores (see e.g. T Touri et al., "Filtration technique enhanced by elektro-acoustic methods", Process Tecnology Program, TEKES report, Jyväskylä Mar. 31, 1995). The rotor formed according to the present invention may also be combined with a sound wave transmitter, especially ultrasound, and/or devices for obtaining an electric field. The combination of sound waves and electric fields which are designated as an electro-acoustic method, has proven to be very efficient in preventing filters from getting clogged during a filtration process. A highly effective filtration is achieved by means of an electro-acoustic apparatus in combination with the special rotor design described above.

The separation device according to the present invention can be used to separate both solid particles, solved high-molecular substances and colloids from a liquid and to separate a liquid from another liquid.

The filter material is chosen on the basis of the separation process. The filter membrane can, for example, be a porous textile cloth, a paper cloth or a membrane of the type described in one of the patent publications mentioned in the introduction. The filter membrane itself can also, if wished, be provided with one or more layers of a porous material, e.g. of the type described in the above patent publications. The filter may also comprise a ceramic filter known per se or some other rigid and porous material.

It is evident to a person skilled in the art that the various embodiments of the invention may vary within the scope of the enclosed claims.

We claim:

1. A method for separation of constituents, separable in a filter, from a liquid medium containing such constituents, whereby a separation device is used comprising a cell or a stack of a plurality of adjacent cells, whereby each cell is comprised of:

a plate unit containing at least one filter;

at least one inlet for supplying the liquid medium into a chamber;

at least one outlet for discharging part of the liquid medium as reject, whereby said inlet and outlet are positioned on a first side of the filter;

at least one outlet on a second side of the filter for discharging a liquid medium as permeate which has passed through the filter, whereby the liquid medium supplied to the chamber is subjected to a strong turbulence created by a rotor; whereby deposition of separable constituents on the filter is reduced, wherein the rotor comprises a plurality of circumferentially distanced rotor wings in which an essentially plane surface of the rotor wings directed towards the filter comprises one or more areas deviating from the plane of said surface, or the surface of the rotor wings directed towards the filter is curved in such a way that distance between the surface of the wing and the filter is small at an inner portion of the rotor and that said distance gradually increases towards a periphery of the rotor, or a section of the rotor wings in a plane parallel with the filter forms an essentially S-shaped surface, whereby the S-shape is continuous.

2. A device for separation of constituents, separable in a filter, from a liquid medium containing such constituents, whereby said device comprises a cell or a stack of a plurality of adjacent cells, whereby each cell is comprised of:

a plate unit provided with a through going center hole containing at least one filter;

at least one inlet for supplying the liquid medium into a chamber;

at least one outlet for discharging part of the liquid medium as reject, whereby said inlet and outlet are positioned on a first side of the filter;

at least one outlet on a second side of the filter for discharging a liquid medium as permeate which has passed through the filter, and a rotor positioned on the first side of the filter, said rotor comprising a plurality of circumferentially distanced rotor wings which are movable along a surface of the filter, whereby the rotor includes a rotor shaft running through the center hole of the plate unit, whereby the rotor wings are designed so that rotational movement of the wings causes strong enough turbulence in surrounding liquid medium to reduce precipitation of separable constituents on the filter, wherein an essentially plane surface of the rotor wings directed towards the filter comprises one or more areas deviating from the plane of said surface, or the surface of the rotor wings directed towards the filter is curved in such a way that a distance between the surface of the wing and the filter is small at an inner portion of the rotor and that said distance gradually increases towards a periphery of the rotor, or a section of the rotor wings in a plane parallel with the filter forms an essentially S-shaped surface, whereby the S-shape is continuous.

3. A device according to claim 2, wherein the rotor wings are provided with at least one through hole, at least one recess, at least one boss, or a combination of at least two of said at least one through hole, said at least one recess and said at least one boss.

4. A device according to claim 3, wherein the at least one boss includes bosses composed of separate compressable, liquid or gas impermeable bodies mounted in holes or recesses in the rotor wing or fastened on the surface of the rotor wing.

5. A device according to claim 2, wherein the rotor wings are provided with a least one through hole, at least one recess, at least one boss, or a combination of at least two of said at least one through hole, at least one recess and at least one boss.

6. A device according to claim 5, wherein the surface of the rotor wings directed towards the filter is curved in such a way that the distance between the surface of the wing and the filter is small at an inner portion of the rotor and that said distance gradually increases towards a periphery of the rotor.

7. A device according to claim 6, wherein the at least one boss includes bosses composed of separate compressable, liquid or gas impermeable bodies mounted in holes or recesses in the rotor wing or fastened on the surface of the rotor wing.

8. A device according to claim 2, wherein the S-shaped rotor possesses a convex profile formed so that an angle $\alpha$ between a line L drawn from the rotor shaft to an arbitrary point P on the profile and a tangent T to the profile in said point, is essentially constant.

9. A device according to claim 2, further including a sound wave transmitter and/or a device for obtaining an electric field.

* * * * *